(12) United States Patent
Barvesten

(10) Patent No.: US 6,714,802 B1
(45) Date of Patent: Mar. 30, 2004

(54) PORTABLE COMMUNICATION APPARATUS HAVING FIRST AND SECOND USER INTERFACES, AND AN ACCESSORY DEVICE COMPRISING A KEYPAD AND A DISPLAY FOR A PORTABLE RADIO TELEPHONE

(75) Inventor: Mats Barvesten, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 09/667,204

(22) Filed: Sep. 21, 2000

(30) Foreign Application Priority Data

Sep. 21, 1999 (SE) .............................. 9903435

(51) Int. Cl.7 .............................. H04M 1/00
(52) U.S. Cl. ............... 455/575.1; 455/90.3; 455/550.1; 455/575.3
(58) Field of Search .................. 455/90, 550, 556, 455/566, 557, 558, 575, 351, 74, 66, 344, 347, 90.3, 550.1, 575.1, 575.3, 575.8, 556.2; 345/467, 157, 168

(56) References Cited

U.S. PATENT DOCUMENTS

| 5,303,291 A | | 4/1994 | Takagi et al. |
| --- | --- | --- | --- |
| 5,479,479 A | | 12/1995 | Braitberg |
| 5,625,673 A | * | 4/1997 | Grewe et al. ................ 455/556 |
| 5,719,936 A | | 2/1998 | Hillenmayer |
| 5,758,295 A | * | 5/1998 | Ahlberg et al. ............. 455/566 |
| 5,797,102 A | | 8/1998 | Hallikainen et al. |
| 6,047,196 A | * | 4/2000 | Makela et al. .............. 455/556 |
| 6,174,205 B1 | * | 1/2001 | Madsen et al. ............. 439/638 |
| 6,230,970 B1 | * | 5/2001 | Walsh et al. ................ 235/379 |
| 6,271,865 B1 | * | 8/2001 | Yu et al. ..................... 345/467 |

FOREIGN PATENT DOCUMENTS

| DE | 296 03 655 | 2/1996 |
| --- | --- | --- |
| EP | 776 115 | 5/1997 |
| EP | 776 140 | 5/1997 |
| EP | 812 095 | 12/1997 |
| FR | 2 760 933 | 3/1997 |
| WO | WO97/12470 | 4/1997 |

* cited by examiner

Primary Examiner—Sonny Trinh
(74) Attorney, Agent, or Firm—Burns, Doane, Swecker & Mathis, L.L.P.

(57) ABSTRACT

A portable communication apparatus, such as a mobile telephone, has a main apparatus housing, a first user interface with a first keypad, such as an ordinary telephone keypad, and a first display. The apparatus also has a second user interface with a second keypad, preferably a typewriter-type keyboard, and a second display, which preferably is larger than the first display. The second keypad and the second display are detachably connectable to the main apparatus housing of the portable communication apparatus.

23 Claims, 3 Drawing Sheets

PORTABLE COMMUNICATION APPARATUS HAVING FIRST AND SECOND USER INTERFACES, AND AN ACCESSORY DEVICE COMPRISING A KEYPAD AND A DISPLAY FOR A PORTABLE RADIO TELEPHONE

This application claims priority under 35 U.S.C. §§119 and/or 365 to 9903435-7 filed in Sweden on Sep. 21, 1999; the entire content of which is hereby incorporated by reference.

BACKGROUND

The present invention relates to portable communication apparatuses of the type having a main apparatus housing and a user interface comprising a keypad and a display.

Portable communication apparatuses of the kind described are of course commonplace. A well-known example is a cellular or mobile telephone, which operates for instance in a GSM system (Global System for Mobile communications in Europe) or D-AMPS (Digital Advanced Mobile Phone System, in the United States of America).

In addition to their basic role as a means for performing wireless communication of speech between human users, contemporary mobile telephones often provide a plurality of services other than just communication of speech. One very common service is the ability to send short text messages (for instance SMS—Short Messages Services in GSM), where a user of a telephone may generate a text message, containing a predetermined maximum number of alphanumeric characters, and then send it across the mobile telephone network to an intended receiver.

In a standard mobile telephone, the ordinary telephone keypad thereof will be used for entering the textstring (string of alphanumeric characters) to be incorporated in the message. Since an ordinary telephone keypad typically only contains keys for the digits 0 through 9, and a few other keys such as a * key and a # key, this limited set of different keys will have to represent a larger number of different alphanumeric characters, for instance the 25 different characters of the English alphabet.

In reality, each numeric key 0–9 must represent several different alphanumeric characters. For instance, the numeric key 2 may represent the alphanumeric characters A, B, C, as well as country-specific characters, such as Á, Å, AE, á, ç, [, and also the digit 2. The user will choose between different characters by depressing the numeric key 2 for a different number of times in sequence.

The same approach is used for creating and editing entries in an electronic telephone book, which is normally included in the mobile telephone.

While many people use their mobile telephones mainly for speech calls, other user categories frequently use the above options for generating text messages and/or creating/editing entries in the electronic telephone book. In particular, people that have a mobile occupation or lifestyle are in many cases frequent users of such text-based services. Well-known examples of such people are young people (teenagers) and business people.

For frequent users of the text-based services of a mobile telephone, the ordinary telephone keypad is a far from perfect tool for inputting text into the mobile telephone. Having to press different keys repeatedly for different number of times is tedious, time-consuming and inefficient. Therefore, there is a pronounced need for an improved way of inputting text into a mobile telephone.

Moreover, the standard display of a mobile telephone normally has a restricted size and is therefore only capable of presenting a limited number of different characters at the same time.

A previously known solution to the problem of providing an improved user interface is a device, which is a combination between a mobile telephone and a portable computer. Such a device (often referred to as a personal digital assistant—PDA) is disclosed in EP-A-0 776 140 and comprises two separate user interfaces and an outer housing, which can be unfolded. When the outer housing is closed, the device has the appearance and size of an ordinary mobile telephone, wherein a first user interface is available, which substantially corresponds to an ordinary telephone user interface (i.e. a display and a numeric telephone keypad). When, on the other hand, the outer housing is unfolded, a second user interface is exposed, which offers a larger display and an alphanumeric keyboard. The alphanumeric keyboard and the large display of the second user interface may be used for inputting alphanumeric messages (textstrings), for instance for generating an SMS message or for manipulating an entry in an electronic telephone book. The large display of the second user interface may also be used in a graphic mode for displaying images etc.

While the device of EP-A-0 776 140 offers several useful features, it has a few distinct drawbacks for certain types of users. Firstly, the device is considerably more advanced than an ordinary mobile telephone. Consequently, the price thereof as well as the necessary knowledge level of the user is considerably higher than for an ordinary mobile telephone. Furthermore, the overall apparatus size, weight and power consumption are larger than for an ordinary mobile telephone.

Therefore, for users that either do not have enough money to buy an advanced PDA device known from EP-A-0 776 140, or simply do not find the various advanced features thereof to be of any particular usefulness from their personal point of view, the device of EP-A-0 776 140 does not represent an optimal solution to the problem of facilitating the input of text to a mobile telephone.

SUMMARY OF THE INVENTION

In view of the above, it is an object of the present invention to provide an accessory device, which will make it easier for a user of a mobile telephone to input text into the telephone, without having to rely solely on the ordinary numeric telephone keypad thereof.

Another object of the present invention is to provide a portable communication apparatus, which is more flexible than the prior art devices. More specifically, the portable communication apparatus shall appear in a compact size, having a low weight and a low power consumption, in situations where the user is only interested in normal telephony services (communication of speech). On the other hand, in situations where more advanced features than normal speech communication are required (such as text processing or presentation of graphic information), the portable communication apparatus shall provide a user interface, which in better for these services.

The above objects have been achieved by a portable communication apparatus, which has a main apparatus housing, a first user interface with a first keypad and a first display, and a second user interface with a second keypad and a second display, where the second keypad and the second display are detachably connectable to the main apparatus housing of the portable communication apparatus.

The objects are also achieved by the provision of an accessory device for a portable radio telephone of the above type, where the accessory device has a device housing comprising first and second housing portions, a second keypad is provided in the first housing portion, a second display is provided in the second housing portion, engagement means are provided for physically and operatively connecting the accessory device to the radio telephone, and controller means are adapted to receive keystrokes entered by the user on the second keypad and are also adapted to present the entered keystrokes on the second display.

Other objects, features and advantages of the present invention will appear from the following detailed disclosure of a preferred embodiment, from the drawings as well as from the attached subclaims.

BRIEF DESCRIPTION OF THE DRAWINGS

The present invention will now be described in more detail, reference being made to the accompanying drawings, in which.

DESCRIPTION

Figure 1:
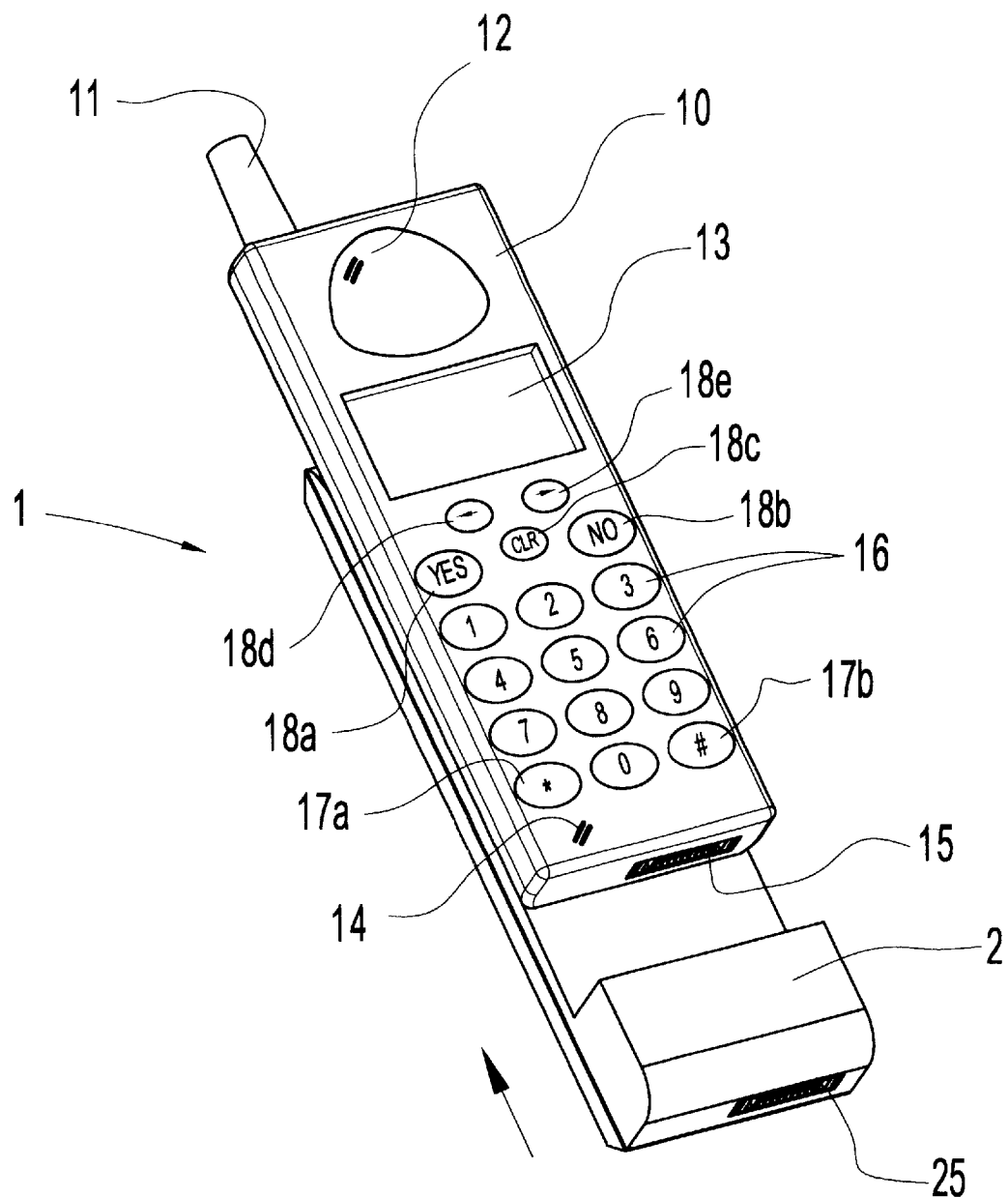
FIGS. 1–3 are schematic views of a portable communication apparatus and a detachable accessory device according to a preferred embodiment of the present invention.

FIG. 1 illustrates a portable communication apparatus 1 together with an accessory device 2 according to a preferred embodiment of the invention. For the rest of this specification, the portable communication apparatus 1 will be exemplified by, and referred to as, a radio telephone, and more specifically a mobile GSM telephone. The mobile telephone 1 is per se essentially known from the prior art and comprises an apparatus housing 10, an antenna 11 mounted on top of the housing, a loudspeaker 12 provided in an upper front portion of the housing, a visual display 13 and a microphone 14, which also are provided at the front portion of the apparatus housing 10. Moreover, the mobile telephone 1 comprises an ordinary numeric telephone keypad having a plurality of numeric keys 16, each of which represents a respective digit 0 through 9. A * key and a # key 17a, 17b are also provided and have ordinary functions.

The keypad also comprises a YES key 18a, which in a conventional way is used e.g. for answering an incoming call, or for performing an affirmative action in any routine or option provided by the man-machine interface of the mobile telephone 1. A NO key 18b similarly has a function for providing a negative response to any such function within the man-machine interface. It will also be used in an ordinary way for terminating an ongoing call. Moreover, it may be used as a power-on key for turning on the mobile telephone 1.

The telephone keypad also comprises a clear key 18c, which for instance may be used for resetting the man-machine interface to an initial state (escaping from any option within a menu system provided by the man-machine interface), and arrow keys 18d, 18e, which are used for scrolling through different options in the man-machine interface.

The mobile telephone 1 also comprises, at a lower end of the apparatus housing 10, an accessory connector 15, which may be used for connecting the mobile telephone 1 to any commercially available accessory device, such as a hands-free set or a battery charger.

Figure 2:
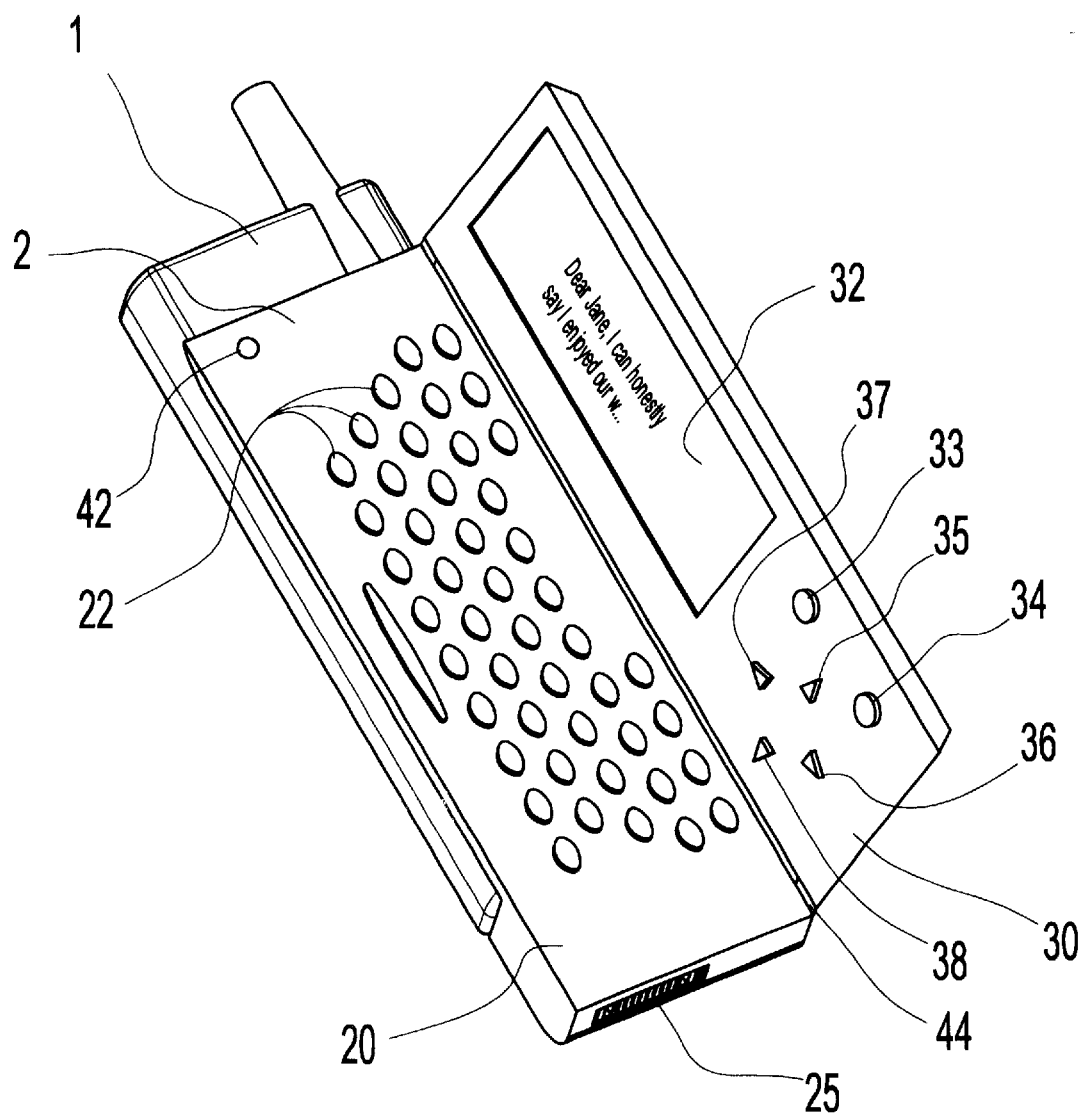
Figure 3:
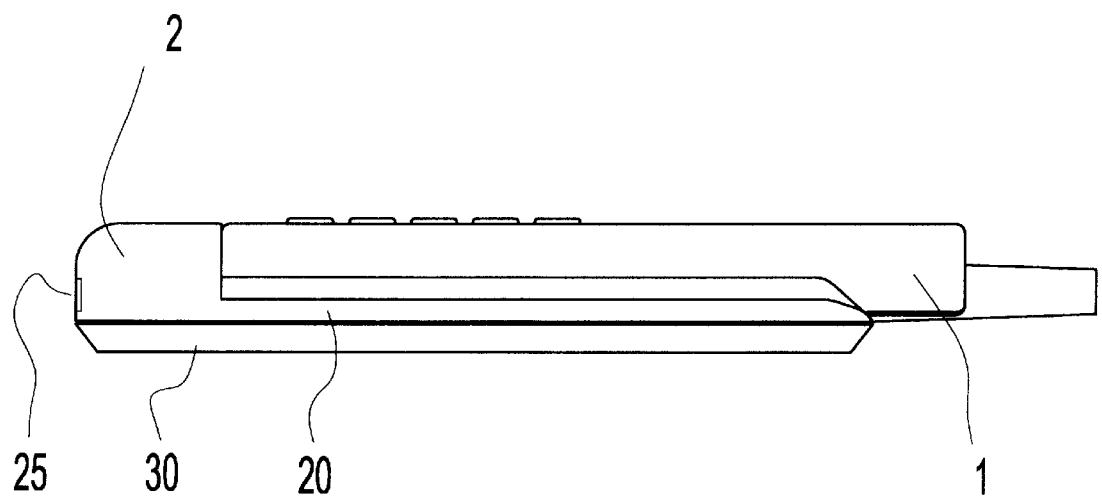

The lower portion of FIG. 1 discloses a novel accessory device 2 having an external connector (not shown) to be detachably inserted in the accessory connector 15 of the mobile telephone 1 by pushing the accessory device 2 towards the mobile telephone 1 in a direction indicated by an arrow in FIG. 1, The accessory device 2, which is illustrated in more detail in FIGS. 2 and 3, comprises a first housing portion 20 and a second housing portion 30. The housing portions 20 and 30 are coupled to each other by means of a hinge mechanism 44. The accessory device 2 is securely mounted to the rear side of the mobile telephone 1 by means of a releasable fastening member 42, such as a screw. As shown in FIG. 2, the first housing portion 20 comprises a keyboard 22, which resembles an ordinary typewriter-type keyboard (QWERTY keyboard). The second housing portion 30 comprises a large display 32 as well as cursor navigation keys 35–38, a YES/OK key 13 and a NO/CANCEL key 34. The second housing portion 30 is foldable between a closed position shown in FIG. 3 and a opened position shown in FIG. 2. At the lower end of the first housing portion 20, an external accessory connector 25 is provided, which is essentially identical to the accessory connector 15 of the mobile telephone 1. The external accessory connector 25 may be used for connecting an additional accessory device, such an a battery charger, to the accessory device 2 and, indirectly, to the mobile telephone 1.

The keyboard 22 comprises a plurality of alphabetic character keys, including the keys A through Z of the normal English alphabet. A plurality of numeric keys 32 representing the digits 0 through 9 are also provided on the keyboard 22.

A shift key is also included and may be used in a manner known per se for toggling the function of each alphabetic key between the character value printed on the face of the key (for instance K) and another character (such as the Nordic character Ö). The shift key may also be used for toggling the function of the numeric keys between for instance 1 and |.

At the lower portion of the keyboard 22 a space key is provided. In the following, the various different keys of the keyboard 22 will be commonly referred to as "alphanumeric keys".

According to the preferred embodiment the keyboard 22 also comprises a plurality of programmable function keys, which may be used for entering certain options in the man-machine interface of the mobile telephone 1. Preferably, the function keys comprise a key for generating a text message (such as an SMS message in GSM) to be sent to another user. When this SMS function key is pressed, the logic circuitry inside the accessory device 2 (shown in more detail in FIG. 7) will form a digital control signal, preferably in the form of an AT command sequence, which contains a sequence of commands that will cause the mobile telephone 1 to enter an option for generating and sending an SMS message in the man-machine interface of the telephone 1. In other words, striking the SMS function key will cause the mobile telephone 1 to enter its menu option for sending an SMS message, and the user will be provided with an empty display 32 having a blinking cursor, which indicates that the mobile telephone 1 is ready to receive an entered text message character by character. The user may now enter the text message, character by character, by striking the different keys of the keyboard 22. All entered characters will be shown on the display 32, and the user may navigate within the entered text message by means of the navigation keys 35–38 provided to the right of the display 32 on the second housing portion 30. Once the message has been completely entered, it may be submitted by pressing the YES/OK button 33.

Similarly the function keys of the keyboard 22 may comprise a phonebook key, which will invoke another option in the man-machine interface of the mobile telephone 1, viz, an option for entering the electronic telephone book thereof.

As already mentioned, the accessory device 2 comprises an external connector (not shown in the drawings) at the upper portion thereof. The purpose of this connector is to mate with the accessory connector 15 of the mobile telephone 1, so as to operatively connect the accessory device 3 to the mobile telephone 1. The connector of the accessory device 2 comprises a plurality of connecting members or pins as well as two engagement members, which are adapted to mate with corresponding engagement recesses in the accessory connector 15 of the mobile telephone 1. The individual connecting members have predetermined electrical functions as signal lines or power supply lines. More specifically, two of the connecting members are power supply pins, which are adapted to engage with corresponding contacts of the accessory connector, thereby receiving electric power from the power source (battery) of the mobile telephone 1. Consequently, the accessory device 2 of the preferred embodiment has no internal power source but receives all necessary electric power from the mobile telephone 1. Other connecting members may have the purpose of acting as serial communication lines, reference voltage lines etc.

Figure 4:
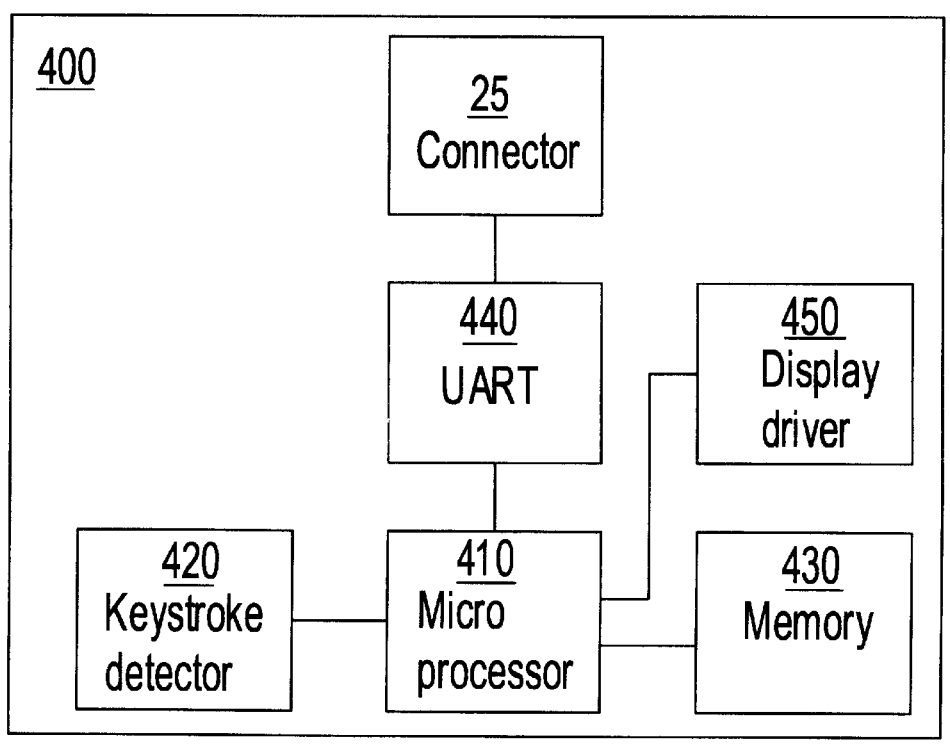
FIG. 4 is a schematic block diagram of a printed circuit board and the fundamental components thereon according to the preferred embodiment of the accessory device.

Referring now to FIG. 4, a schematic illustration of a printed circuit board 400 is given. The printed circuit board 400 in mounted within an internal cavity in the first housing portion 20 of the accessory device 2. A controller 410 has the main responsibility for controlling and performing the functionality of the keyboard 22 and display 32. In the preferred embodiment, the controller 410 is implemented by a programmable microprocessor of any commercial type. The controller 410 is connected to a keystroke detector circuit 420, which has the purpose of detecting when the user strikes an individual key on the keyboard 22, and forwarding this information to the controller 410.

Moreover, the printed circuit board 400 comprises an electronic memory 430 for storing program instructions to be executed by the controller 410, as well as reference data to be used for identifying individual keys in response to the detection of a particular keystroke. The memory 430 may be implemented by any commercially available electronic memory, such as an REPROM memory. Moreover, it may advantageously be integrated with the controller 410, particularly it the latter is realized as a programmable microprocessor. The printed circuit board 410 also comprises a display driver circuit 450 for presenting text characters or graphical information on the display 32.

According to the preferred embodiment, the accessory device 2 communicates with the mobile telephone 1 over a serial communication interface at a rate of 9600 bps. Therefore, the printed circuit board 400 is provided with a transceiver for performing serial communication with the mobile telephone 1. In the preferred embodiment the transceiver 440 is realized as a Universal Asynchronous Transmitter Receiver, which is connected to the additional accessory connector 25 of the accessory device 2. Naturally, the transceiver 440 is also connected to the upper connector of the accessory device, i.e. the connector which is adapted to mate with the accessory connector 15 of the mobile telephone 1.

In the preferred embodiment, all keystrokes detected by the accessory device 2 will be sent through the accessory connector 15 to the mobile telephone 1, and more particularly to the central controller thereof, which controls and operates the man-machine interface of the mobile telephone 1. This information is preferably sent as AT command sequences. Similarly, the controller 410 of the accessory device 2 is adapted to receive text or graphic information to be presented on the large display 32. In this way, the accessory device 2 may be used not only for entering text but also for browsing the Internet in WAP applications (Wireless Application Protocol). In this respect, the navigation keys 35–38 may be used for moving a cursor across the display 32, and the YES/OK key 33 may be used for performing operations similar to mouse clicks.

Consequently, the accessory device 2 of the preferred embodiment is intended to provide an improved user interface for accessing functionality provided by the central controller and man-machine interface of the mobile telephone 1. However, the controller 410 of the accessory device 2 may also be arranged to provide additional functionality, which is not included in the standard man-machine interface of the mobile telephone 1.

Preferably, the accessory device 2 is provided with a switch for detecting whether the second housing portion 30 is opened or closed. The controller 410 is connected to this switch and is adapted to forward information regarding the opened or closed position of the foldable second housing portion to the central controller of the mobile telephone 1. This information may also be used by the controller 410 in order to turn a backlight illumination of the display 32 on and off, respectively, depending on the position of the foldable second housing portion 30.

The present invention has been described above with reference to a preferred embodiment. However, other embodiments than the one disclosed are equally possible within the scope of the invention, as defined by the appended independent patent claims.

What is claimed is:

1. A portable communication apparatus having a main apparatus housing, a first controller, a user interface with a first keypad, a first display, and means for receiving characters adapted to form text in response to keystrokes entered by a user on the first keypad, an accessory connector, and an external accessory device with a second keypad, a second display, and a second controller adapted to present keystrokes entered by the user on the second keypad as text on the second display, wherein the first controller is adapted to receive digital signals representing the keystrokes entered on the second keypad from the accessory device through the accessory connector and to forward the digital signals to the character receiving means, the character receiving means is further adapted to form text in response to the keystrokes entered on the second keypad, and the external accessory device is detachably connectable to the accessory connector.

2. The apparatus of claim 1, wherein the accessory device is divided into a first housing portion, in which the second keypad is provided, and a second housing portion, in which the second display is provided.

3. The apparatus of claim 2, wherein the first housing portion and the second housing portion are pivotally coupled to each other.

4. The apparatus of claim 3, comprising a hinge between the first housing portion and the second housing portion.

5. The apparatus of claim 2, wherein the second housing portion comprises a third keypad, which has keys for navigating a cursor on the second display.

6. The apparatus of claim 2, wherein the second housing portion comprises a third keypad, and the first controller is arranged to receive digital signals denoting affirmative and negative actions from the accessory device through the accessory connector, the actions being directed to the user interface and being entered by the user as keystrokes on the third keypad.

7. The apparatus of claim 1, further comprising means for securing the accessory device to a rear portion of the main apparatus housing, wherein the first keypad and the first display are provided at a front portion of the main apparatus housing.

8. The apparatus of claim 1, further comprising a battery, wherein the battery is disposed in the main apparatus housing, and the accessory connector is arranged to supply electric power to the accessory device from the battery.

9. The apparatus of claim 1, wherein the first keypad is a numeric telephone keypad, and the second keypad comprises alphanumeric keys substantially corresponding to a typewriter keyboard.

10. The apparatus of claim 1, wherein the apparatus is a radio telephone.

11. The apparatus of claim 1, wherein the accessory device comprises serial communication means, means for detecting keystrokes on the second keypad, and a display driver for the second display.

12. A portable communication apparatus having a main apparatus housing, a first user interface with a first keypad and a first display, and a second user interface with a second keypad and a second display, wherein the second keypad and the second display are detachably connectable to the main apparatus housing; the second keypad and the second display are formed as an accessory unit; the accessory unit is divided into a first housing portion, in which the second keypad is provided, and a second housing portion, in which the second display is provided; the second housing portion comprises a third keypad, which has keys for navigating a cursor on the second display; and the third keypad has keys for performing affirmative and negative actions in the first user interface and in the second user interface.

13. An accessory device for a portable radio telephone having a user interface that includes a first keypad, a first display, a first controller, and means for receiving characters adapted to form text in response to keystrokes entered by a user on the first keypad, the accessory device comprising a second keypad, a second display, an accessory connector for detachably connecting with the radio telephone, and a second controller adapted to detect keystrokes entered by the user on the second keypad, to present the entered keystrokes as text on the second display, to generate digital signals representing the detected keystrokes, and to transfer the digital signals through the accessory connector to the character receiving means.

14. The accessory device of claim 13, wherein the first housing portion and the second housing portion are pivotally coupled to each other.

15. The accessory device of claim 14, comprising a hinge between the first housing portion and the second housing portion.

16. The accessory device of claim 13, wherein electric power from a battery of the portable radio telephone is received through the accessory connector.

17. The accessory device of claim 13, wherein the second keypad comprises alphanumeric keys substantially corresponding to a typewriter keyboard.

18. The accessory device of claim 13, wherein the second housing portion comprises a third keypad having keys for navigating a cursor on the second display.

19. The accessory device of claim 18, wherein the third keypad has keys for performing affirmative and negative actions in the user interface.

20. The accessory device of claim 13, wherein the digital signals are generated according to a serial communication protocol.

21. The accessory device of claim 20, wherein the digital signals are generated with at least a universal asynchronous receiver-transmitter.

22. The accessory device of claim 13, further comprising a device housing having first and second housing portions, wherein the second keypad is provided in the first housing portion, and the second display is provided in the second housing portion.

23. The accessory device of claim 13, further comprising a second accessory connector for connecting another accessory device to the radio telephone.

* * * * *